(12) United States Patent
Gauvin

(10) Patent No.: US 8,225,396 B1
(45) Date of Patent: Jul. 17, 2012

(54) SYSTEMS AND METHODS FOR DETECTING AND WARNING USERS ABOUT HIDDEN SENSITIVE INFORMATION CONTAINED IN WEBPAGES

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 475 days.

(21) Appl. No.: 12/412,785

(22) Filed: Mar. 27, 2009

(51) Int. Cl.
*G06F 21/00* (2006.01)
(52) U.S. Cl. .............. 726/22; 705/319; 705/325
(58) Field of Classification Search .......... 726/22; 705/319, 25
See application file for complete search history.

(56) References Cited

U.S. PATENT DOCUMENTS

| | | | |
|---|---|---|---|
| 7,472,413 B1 * | 12/2008 | Mowshowitz | 726/10 |
| 7,542,943 B2 * | 6/2009 | Caplan et al. | 705/40 |
| 7,562,304 B2 * | 7/2009 | Dixon et al. | 715/738 |
| 2003/0078818 A1 * | 4/2003 | Hoffman et al. | 705/7 |
| 2004/0187023 A1 * | 9/2004 | Alagna et al. | 713/200 |
| 2008/0127338 A1 * | 5/2008 | Cho et al. | 726/22 |
| 2008/0294607 A1 * | 11/2008 | Partovi et al. | 707/3 |
| 2010/0169364 A1 * | 7/2010 | Hardt | 707/769 |

OTHER PUBLICATIONS

Hansen et al."Privacy and Identity Management" IEEE. 2008.*

* cited by examiner

*Primary Examiner* — Philip Chea
*Assistant Examiner* — Kendall Dolly
(74) *Attorney, Agent, or Firm* — Advantedge Law Group

(57) ABSTRACT

Computer-implemented methods, systems, and computer-readable media for detecting and warning users about hidden sensitive information contained in webpages are disclosed. In one example, an exemplary method for performing such a task may comprise: 1) identifying a webpage accessed by a web browser on a computing device, 2) detecting, within the webpage, hidden sensitive information that is not visually displayed by the web browser, and then 3) warning a user of the computing device that the webpage contains the hidden sensitive information.

20 Claims, 7 Drawing Sheets

SYSTEMS AND METHODS FOR DETECTING AND WARNING USERS ABOUT HIDDEN SENSITIVE INFORMATION CONTAINED IN WEBPAGES

BACKGROUND

Online-communication mechanisms, such as social-networking websites, professional-networking websites, e-commerce websites, and user-generated content websites (such as YOUTUBE and WIKIPEDIA), allow computer users to communicate with, meet, and exchange information and goods with others in a variety of ways. In order to facilitate such communication, many of these online-communication mechanisms automatically generate or require users to create publicly-viewable user profile pages.

Unfortunately, some publicly-viewable user profile pages may contain hidden private data that, while not visually displayed when the page is rendered by a web browser, may nonetheless be extracted from the page. For example, the code used to render a social-networking user profile may contain information that identifies the age and location of the user, even if this sensitive information is not visually displayed when the webpage is rendered in a web browser. This can be especially problematic for social-networking sites used by minors, since this hidden private data may be extracted and used by predators.

SUMMARY

As will be described in greater detail below, the instant disclosure generally relates to systems and methods for detecting and warning users about hidden sensitive information contained in webpages. An exemplary method for performing such a task may comprise: 1) identifying a webpage accessed by a web browser on a computing device, 2) detecting, within the webpage, hidden sensitive information that is not visually displayed by the web browser, 3) and then warning a user of the computing device that the webpage contains hidden sensitive information.

The systems disclosed herein may identify webpages to be scanned for hidden sensitive information in a variety of ways. In one example, a user may direct the system to scan a specific webpage for hidden sensitive information. In another example, the system may: 1) automatically detect when a web browser on a computing device accesses a webpage and then 2) scan the detected webpage for hidden sensitive information. The system may also: 1) detect the initiation of a webpage login procedure by a web browser on a computing device, 2) identify a webpage (such as a user profile on a social-networking site) accessed by the web browser upon completion of the login procedure, and then 3) scan the identified webpage for hidden sensitive information.

The exemplary methods summarized above may be used to detect hidden sensitive information in a variety of webpages, including webpages that contain publicly-viewable user profiles. Examples of such user profiles include, without limitation, social-networking profiles (such as MYSPACE and FACEBOOK user profiles), professional-networking profiles (such as LINKEDIN user profiles), e-commerce user profiles (such as EBAY seller profiles), and user profiles for user-generated content websites (such as YOUTUBE and WIKIPEDIA user profiles).

In some examples, the system may detect hidden sensitive information within a webpage by analyzing the code that is used to render the webpage. For example, the system may: 1) identify, within code used to render a webpage, programmable tags (e.g., "user_age") that map to environment variables (e.g., "17") within the code that are associated with sensitive information and then 2) determine that these identified environment variables are not visually displayed by the web browser.

The system may also automatically detect, using pattern-matching heuristics, information within the code that follows a specific format typically associated with sensitive information (e.g., "XXX-XX-XXXX" for Social Security numbers) and/or contains certain keywords or phrases known to be associated with sensitive information (e.g., "female," "New York," "SSN," etc.).

In some examples, the system may also attempt to determine, by analyzing the code used to render a webpage, whether hidden sensitive information contained within the webpage was intentionally (e.g., maliciously) or unintentionally hidden by a publisher of the webpage. The system may also assign a security-threat level to hidden sensitive information that identifies how severe of a security risk the hidden sensitive information poses. This security-threat level may be based on, for example, the nature of the hidden sensitive information (e.g., whether the sensitive information represents a user's Social Security or credit-card number or merely the user's name) and whether the hidden sensitive information was intentionally or unintentionally hidden by the webpage's publisher.

The system may warn users about hidden sensitive information contained in webpages in a variety of ways. In one example, the system may display a notification that: 1) warns the user that the webpage contains hidden sensitive information and 2) identifies the hidden sensitive information in question. In some examples, the notification may also identify a security-threat level assigned to the hidden sensitive information.

As will be explained in greater detail below, the systems and methods described herein may enable users, parents, IT administrators, and friends to detect hidden sensitive information contained within their own profiles or webpages or within the profiles or webpages of their children, employees, friends, or associates.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
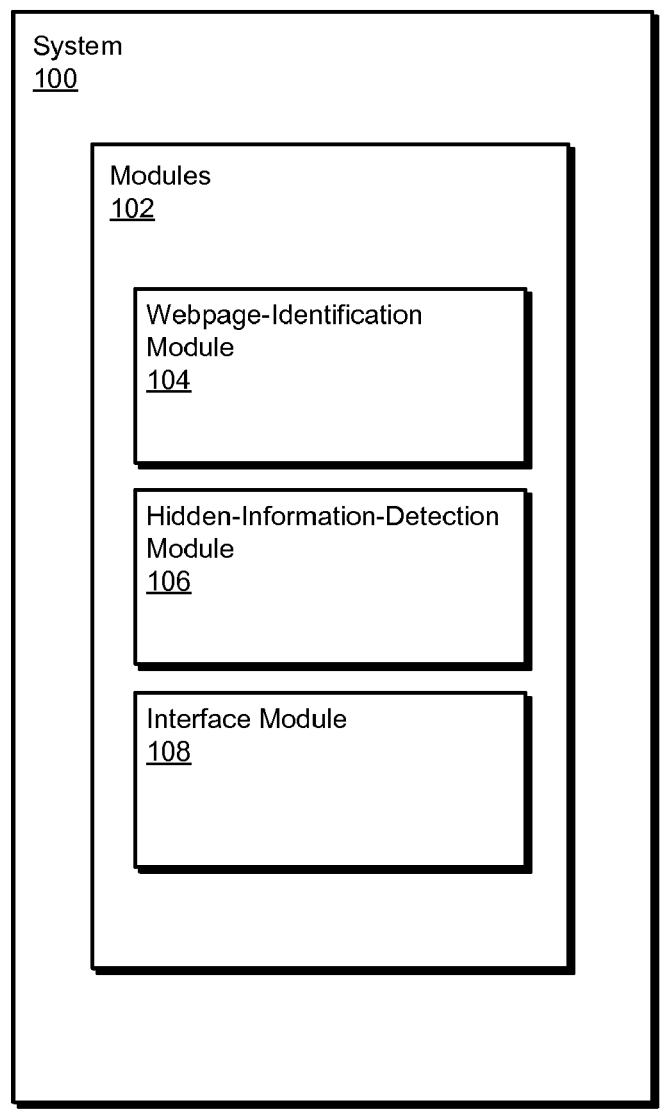
FIG. 1 is a block diagram of an exemplary system for detecting and warning users about hidden sensitive information contained in webpages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting and warning users about hidden sensitive information contained in webpages. As used herein, the phrase "sensitive information" may refer to information that, if revealed or disclosed to untrustworthy individuals with hostile or indeterminable intentions, may result in the loss of an advantage or level of security. As will be explained in greater detail below, examples of sensitive information may include, without limitation, personal information (e.g., information about a private individual, such as an individual's name, age, gender, and contact information), private information (e.g., information associated with a private individual that, if disclosed, may harm the individual's interests, such as an individual's Social Security number or credit card number), confidential business information (e.g., trade secrets, sales and marketing plans, and financial data), or any other information that an individual or entity may wish to protect or keep private.

Figure 2:
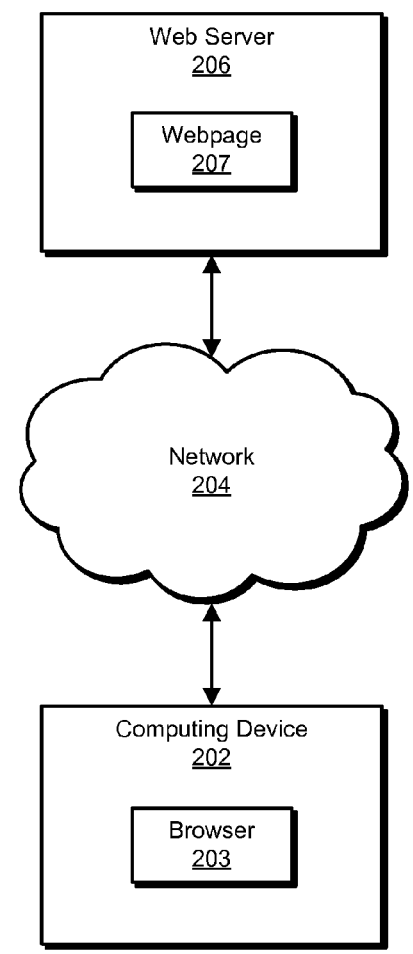
FIG. 2 is a block diagram of an exemplary system for detecting and warning users about hidden sensitive information contained in webpages.

The following will provide, with reference to FIGS. 1-2, detailed descriptions of exemplary systems for detecting and warning users about hidden sensitive information contained in webpages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting and warning users about hidden sensitive information contained in webpages. As illustrated in this figure, exemplary system 100 may comprise one or more modules for performing one or more tasks. For example, and as will be explained in greater detail below, exemplary system 100 may comprise a webpage-identification module 104 programmed to identify webpages accessed by a web browser on a computing device.

Exemplary system 100 may also comprise a hidden-information-detection module 106 programmed to detect, within such webpages, hidden sensitive information that is not visually displayed by the web browser. In addition, and as will be described in greater detail below, exemplary system 100 may comprise an interface module 108 programmed to warn a user of the computing device that the webpage contains hidden sensitive information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. In an additional example, modules 102 may represent a browser plug-in installed on browser 203 on computing device 202. One or more of modules 102 in FIG. 1 may also represent all or portions of one or more special-purpose computers configured to perform one or more tasks.

FIG. 2 is a block diagram of an exemplary system 200 for detecting and warning users about hidden sensitive information contained in webpages. As illustrated in this figure, exemplary system 200 may comprise a computing device 202 in communication with a web server 206 via a network 204. In one embodiment, and as will be described in greater detail below, computing device 202 may be programmed to: 1) identify a webpage 207 accessed by a browser 203 on computing device 202, 2) detect, within webpage 207, hidden sensitive information that is not visually displayed by browser 203, 3) and then warn a user of computing device 202 that webpage 207 contains hidden sensitive information.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Web server 206 generally represents any type or form of computing device that is capable of serving webpages. Examples of web server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSN Network), exemplary network architecture 700 in FIG. 7, or the like. Network 204 may facilitate communication or data transfer using wireless or wired connections. In one embodiment, network 204 may facilitate communication between computing device 202 and web server 206.

Figure 3:
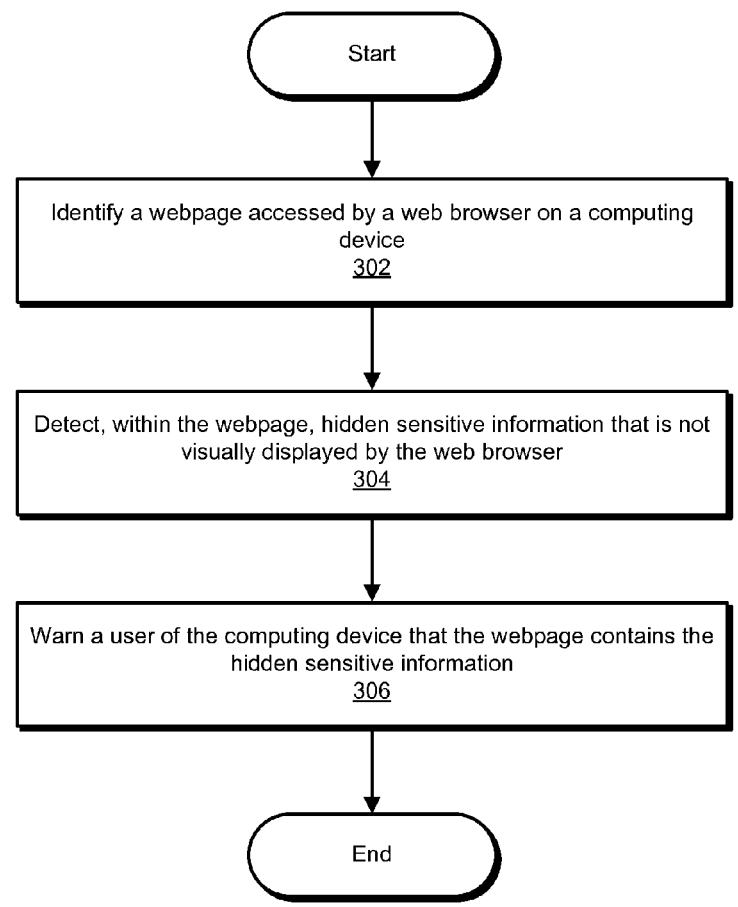
FIG. 3 is a flow diagram of an exemplary method for detecting and warning users about hidden sensitive information contained in webpages.

FIG. 3 is a flow diagram of an exemplary computer-implemented method 300 for detecting and warning users about hidden sensitive information contained in webpages. As illustrated in this figure, at step 302 the system may identify a webpage accessed by a web browser on a computing device. For example, webpage-identification module 104 FIG. 1 (which may, as detailed above, represent a portion of browser 203, a plug-in installed on browser 203, and/or a module on computing device 202 in FIG. 2) may identify a webpage 207 accessed by browser 203 on computing device 202 in FIG. 2.

Figure 4:
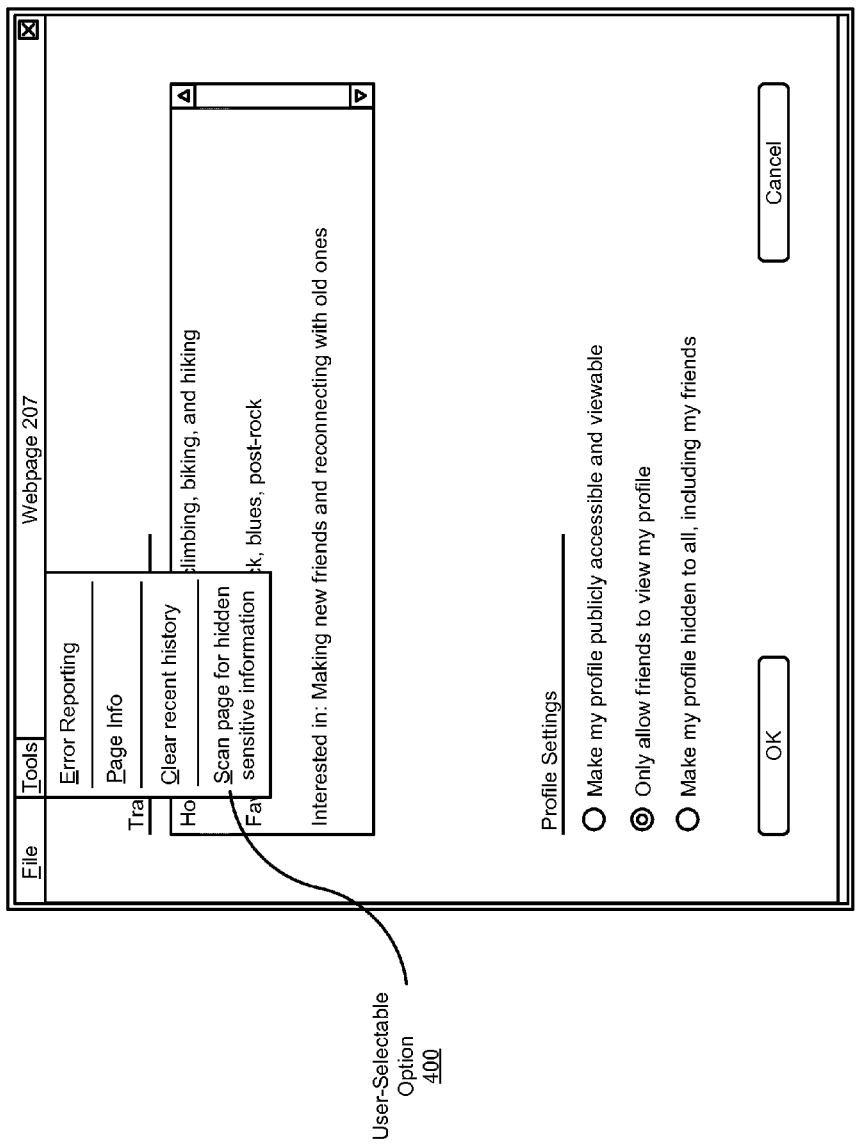
FIG. 4 is an illustration of an exemplary webpage containing hidden sensitive information.

The system may perform step 302 in a variety of ways. In one example, the system may receive a request from a user to scan a webpage for hidden sensitive information. For example, as illustrated in FIG. 4, a user of a browser on a computing device may request that browser 203 scan a webpage 207 displayed within browser 203 for hidden sensitive information by selecting user-selectable option 400 within a toolbar in browser 203.

In an additional example, the system may identify a webpage in step 302 by automatically detecting when a web browser accesses a web page. For example, webpage-identification module 104 in FIG. 1 (which may, as detailed above, represent a portion of browser 203 and/or computing device 202 in FIG. 2) may detect when browser 203 on computing device 202 accesses a webpage.

In another example, the system may identify a webpage in step 302 by automatically detecting a successful attempt by a user of a computing device to log into, via a web browser on the computing device, a webpage. For example, webpage-identification module 104 in FIG. 1 may detect when a user successfully completes, via browser 203, a login process required to access webpage 207.

The webpage detected in step 302 may represent any type or form of webpage that may contain hidden sensitive information. In some examples, the webpage may contain a publicly-viewable user profile. Examples of such user profiles include, without limitation, social-networking profiles (e.g., MYSPACE profiles, FACEBOOK profiles, etc.), professional-networking profiles (e.g., LINKEDIN profiles, executive profiles on company websites, etc.), e-commerce user profiles (e.g., EBAY seller profiles, etc.), user profiles for user-generated content websites (e.g., YOUTUBE, WIKIPEDIA, etc.), or the like.

As explained above, a user of computing device 202 in FIG. 2 may manually request that the system scan a webpage for hidden sensitive information. In this example, the user may request that the system scan one or more of the following for hidden sensitive information: 1) the user's publicly-viewable user profile, 2) the publicly-viewable user profile of a friend of the user, 3) the publicly-viewable user profile of an associate of the user (e.g., the user may represent an IT administrator of a company and the associate may represent an employee of a company), or 4) the publicly-viewable user profile of a relative of the user (such as a child of a parent). The system may also scan such webpages for hidden sensitive information upon automatically detecting when a web browser accesses the same, as detailed above.

Returning to FIG. 3, at step 304 the system may detect, within the webpage identified in step 302, hidden sensitive information that is not visually displayed by the web browser. For example, hidden-information-detection module 106 in FIG. 1 (which may, as detailed above, represent a portion of browser 203, a plug-in installed on browser 203, and/or a module on computing device 202 in FIG. 2) may detect hidden sensitive information contained within a webpage 207 accessed by browser 203 that is not visually displayed by browser 203.

As detailed above, sensitive information may refer to information that, if revealed or disclosed to untrustworthy individuals with hostile or indeterminable intentions, may result in the loss of an advantage or level of security. Examples of sensitive information may include, without limitation, personal information (e.g., information about a private individual, such as an individual's name, age, gender, and contact information), private information (e.g., information associated with a private individual that, if disclosed, may harm the individual's interests, such as an individual's Social Security number or credit card number), confidential business information (e.g., trade secrets, sales and marketing plans, and financial data), or any other information that an individual or entity may wish to protect or keep private.

The system may perform step 304 in a variety of ways. In one example, the system may detect hidden sensitive information within a webpage by analyzing code (e.g., source code) used to render the webpage. Examples of code that may be used to render webpages include, without limitation, programming language code (e.g., JavaScript), non-computational language code (e.g., HTML and other content-rendering languages), or any other language that may be used to render a webpage.

For example, hidden-information-detection module 106 in FIG. 1 may: 1) automatically detect, using pattern-matching heuristics, information within the code used to render a webpage that follows a specific format typically associated with sensitive information (e.g., "XXX-XX-XXXX" for Social Security numbers) and/or contains certain keywords or phrases known to be associated with sensitive information (e.g., "female," "New York," "SSN," etc.) and then 2) determine whether the identified sensitive information is visually displayed by the web browser.

In another example, hidden-information-detection module 106 in FIG. 1 may: 1) identify, within the code used to render a webpage, programmable tags that map to environment variables within the code that are associated with sensitive information and then 2) determine whether the identified environment variables are visually displayed by the web browser. For example, hidden-information-detection module 106 in FIG. 1 may determine, by analyzing the code used to render webpage 207 in FIG. 4, that the code used to render webpage 207 contains the programmable tag "user_age." Hidden-information-detection module 106 may then determine that the code used to render webpage 207 contains, but does visually display within the web browser, an environment variable called "17" that is mapped to the programmable tag "user_age."

In some examples, the system may also attempt to determine, by analyzing the code used to render a webpage, whether sensitive information contained within the webpage was intentionally (e.g., maliciously) or unintentionally hidden by a publisher of the webpage. For example, hidden-information-detection module 106 in FIG. 1 may: 1) scan the code used to render a webpage for programmable tags used to prevent data contained within the code from being visually displayed within a browser (e.g., "hidden" or "no_display") and then 2) determine whether these programmable tags are mapped to environment variables within the code that are associated with sensitive information (e.g., "Female, age 17"). If, by scanning the code used to render a webpage, hidden-information-detection module 106 determines that the code contains such programmable tags mapped to environment variables associated with sensitive information, then hidden-information-detection module 106 may infer that this sensitive information was intentionally hidden by the publisher of the webpage.

In some examples, the system may also assign a security-threat level to hidden sensitive information based on how severe of a security risk the hidden sensitive information poses. For example, if a webpage contains highly sensitive information (such as a user's Social Security number or credit-card number) and this sensitive information appears to have been intentionally hidden by a publisher of the webpage (e.g., if a programmable tag used to hide data is assigned to the sensitive information), then hidden-information-detection module 106 may assign a security-threat level of "High"

to the hidden sensitive information. Alternatively, if a webpage contains mildly-sensitive information (such as a user's name) and this sensitive information appears to have been unintentionally hidden by a publisher of the webpage, then hidden-information-detection module 106 may assign a security-threat level of "Low" to the hidden sensitive information.

Examples of factors that may be used to assess the severity of a security risk posed by hidden sensitive information include, without limitation, the nature of the hidden sensitive information (e.g., whether the sensitive information represents a user's Social Security or credit-card number or merely the user's name), whether the hidden sensitive information was unintentionally hidden, whether the hidden sensitive information was intentionally hidden, or any other factor that may identify the severity of a security risk posed by hidden sensitive information.

In some examples, the system may perform step 304 by identifying and then scanning at least one additional webpage that is associated with the webpage identified in step 302. For example, if a webpage identified in step 302 represents the first page of a social-networking profile of a user, then webpage-identification module 104 in FIG. 1 may: 1) identify all other pages of the social-networking profile of the user and then 2) detect, within these additional pages, hidden sensitive information that is not visually displayed within the user's web browser.

Returning to FIG. 3, at step 306 the system may warn a user of the computing device that the webpage identified in step 302 contains hidden sensitive information. For example, interface module 108 in FIG. 1 (which may, as detailed above, represent a portion of browser 203, a plug-in installed on browser 203, and/or a module on computing device 202 in FIG. 2) may warn a user of computing device 202 that webpage 207 contains hidden sensitive information.

Figure 5:
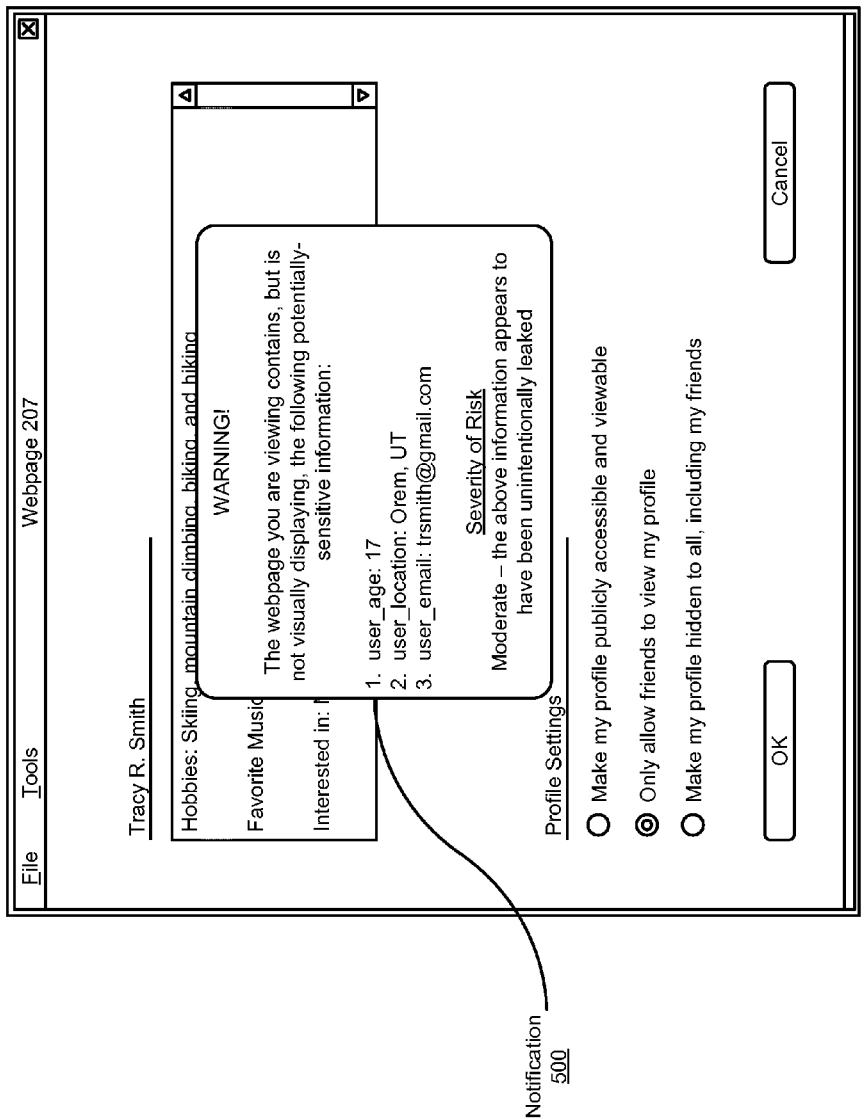
FIG. 5 is an illustration of an exemplary method for warning a user about hidden sensitive information contained within the webpage illustrated in FIG. 4.

The system may warn users in a variety of ways. In one example, the system may generate a graphical user interface and then display, via this graphical user interface, a notification that identifies the sensitive information contained within the webpage that is not visually displayed by the web browser. For example, as illustrated in FIG. 5, interface module 108 in FIG. 1 may generate a notification 500 that: 1) notifies the user that webpage 207 contains hidden sensitive information and 2) identifies the hidden sensitive information contained within the webpage 207 (in this example, the user's age, location, and e-mail address).

In some examples, notification 500 may also contain information that identifies the severity of the security risk posed by the hidden sensitive information. For example, as detailed above, if a webpage contains highly sensitive information (such as a user's Social Security number or credit-card number) and this sensitive information appears to have been intentionally hidden by a publisher of the webpage, then interface module 108 in FIG. 1 may display a warning within notification 500 that indicates that the detected hidden sensitive information contained within webpage 207 represents a "High" security threat. In some examples, the system's generation of a graphical user interface may transform the computational determination made in step 304 into a visual representation displayed on the user's computing device.

As detailed above, the systems and methods described herein may detect and warn users about hidden sensitive information contained within webpages. As such, these systems and methods may prevent a user from inadvertently disclosing sensitive information. These systems and methods may also enable parents, IT administrators, and friends of users to prevent their children, business associates, and friends from inadvertently disclosing sensitive information.

Figure 6:
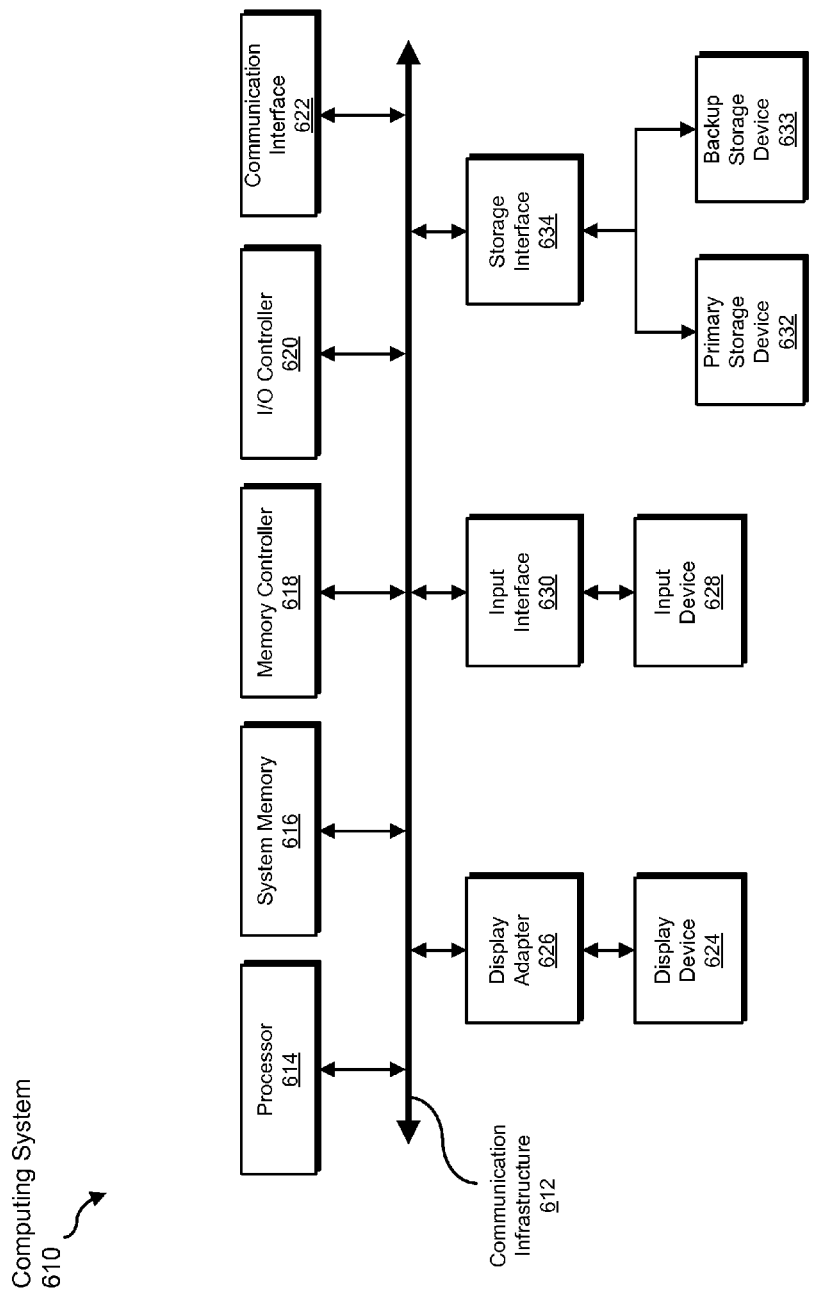
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, detecting, warning, receiving, analyzing, assigning, determining, generating, and displaying steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, detecting, warning, receiving, analyzing, assigning, determining, generating, and displaying.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, detecting, warning, receiving, analyzing, assigning, determining, generating, and displaying steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, detecting, warning, receiving, analyzing, assigning, determining, generating, and displaying steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, detecting, warning, receiving, analyzing, assigning, determining, generating, and displaying steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, detecting, warning, receiving, analyzing, assigning, determining, generating, and displaying steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
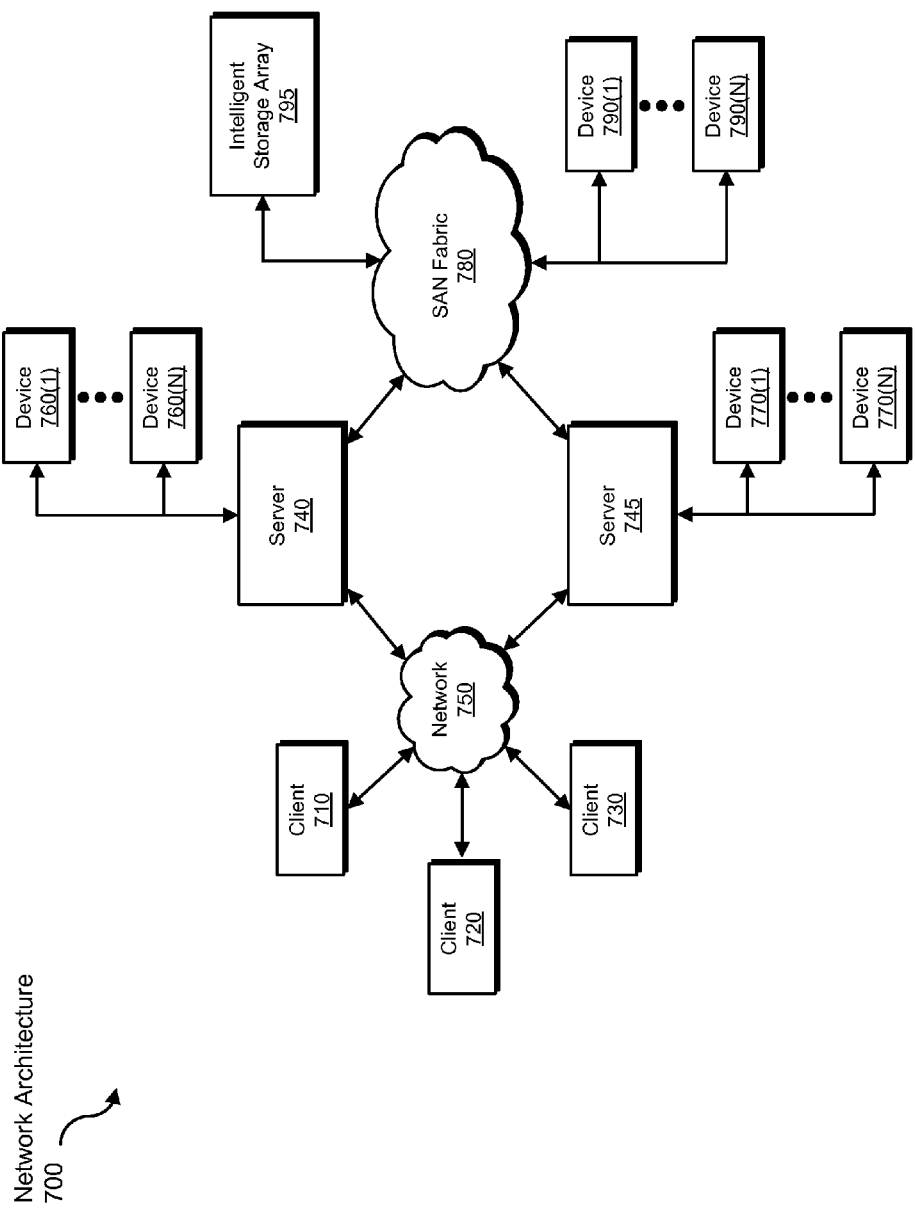
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, detecting, warning, receiving, analyzing, assigning, determining, generating, and displaying steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for detecting and warning users about hidden sensitive information contained in webpages. In one example, this exemplary method may comprise: 1) identifying a webpage accessed by a web browser on the computing device, 2) detecting, within the webpage, hidden sensitive information that is not visually displayed by the web browser, 3) and then warning a user of the computing device that the webpage contains hidden sensitive information.

Identifying the webpage may comprise: 1) receiving a request from the user to scan the webpage for hidden sensitive information, 2) automatically detecting when the web browser accesses the webpage, and/or 3) detecting a successful attempt by the user to log into, via the web browser, the webpage.

In one example, the webpage may comprise a publicly-viewable user profile. Examples of publicly-viewable user profiles include, without limitation, a social-networking profile, a professional-networking profile, an e-commerce user profile, and a user profile for a user-generated content website. Publicly-viewable user profiles may be associated with the user, a friend of the user, an associate of the user, or a relative of the user.

In some examples, detecting, within the webpage, hidden sensitive information that is not visually displayed by the web browser may comprise: 1) identifying at least one additional webpage that is associated with the webpage and then 2) detecting, within the additional webpage, hidden sensitive information that is not visually displayed by the web browser.

Detecting, within the webpage, hidden sensitive information that is not visually displayed by the web browser may also comprise analyzing code used to render the webpage. In one example, analyzing the code used to render the webpage may comprise: 1) identifying, within the code, programmable tags that map to environment variables within the code that are associated with sensitive information and then 2) determining that the environment variables are not visually displayed by the web browser. In another example, analyzing the code used to render the webpage may comprise automatically detecting, using at least one pattern-matching heuristic, hidden sensitive information within the code. The code used to render the webpage may contain programming language code or non-computational language code, such as content-rendering language code.

In one example, the method may further comprise assigning a security-threat level to the hidden sensitive information based on how severe of a security risk the hidden sensitive information poses. In addition, warning the user may comprise: 1) generating a graphical user interface on the computing device and then 2) displaying, via the graphical user interface, a notification that identifies the hidden sensitive information. This notification may also contain information that identifies a security-threat level assigned to the hidden sensitive information. Examples of hidden sensitive information include, without limitation, a user's name, a user's age, a user's date of birth, a user's gender, a user's mailing address, a user's email address, a user's telephone number, a user's fax number, and a user's instant-messaging address.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting and warning users about hidden sensitive information contained in webpages, at least a portion of the method being performed by a client-side computing device comprising at least one processor, the method comprising:
   identifying, by a plug-in installed within a web browser on the client-side computing device, a publicly-viewable user profile accessed by the web browser on the client-side computing device;
   detecting, by the plug-in installed within the web browser on the client-side computing device, hidden sensitive information contained within the publicly-viewable user profile that is not visually displayed by the web browser but that is publicly accessible by others, wherein the hidden sensitive information comprises information associated with an owner of the publicly-viewable user profile that the owner wishes to keep private;
   warning, by the plug-in installed within the web browser on the client-side computing device, a user of the client-side computing device that the publicly-viewable user profile contains the hidden sensitive information associated with the owner of the publicly-viewable user profile that is not visually displayed but that is publicly accessible by others.

2. The method of claim 1, wherein identifying the publicly-viewable user profile comprises at least one of:
   receiving a request from the user to scan the publicly-viewable user profile for hidden sensitive information;
   automatically detecting when the web browser accesses the publicly-viewable user profile;
   detecting a successful attempt by the user to log into, via the web browser, the publicly-viewable user profile.

3. The method of claim 1, further comprising attempting to determine, by analyzing code used to render the publicly-viewable user profile, whether the hidden sensitive information was intentionally hidden.

4. The method of claim 1, wherein the publicly-viewable user profile comprises:
   a social-networking profile;
   a professional-networking profile;
   an e-commerce user profile;
   a user profile for a user-generated content website.

5. The method of claim 1, wherein the publicly-viewable user profile comprises:
   a publicly-viewable user profile of the user;
   a publicly-viewable user profile of a friend of the user;
   a publicly-viewable user profile of an associate of the user;
   a publicly-viewable user profile of a relative of the user.

6. The method of claim 1, wherein detecting the hidden sensitive information contained within the publicly-viewable user profile that is not visually displayed by the web browser but that is publicly accessible by others comprises:
   identifying at least one additional publicly-viewable user profile that is linked to the publicly-viewable user profile;
   detecting hidden sensitive information contained within the additional publicly-viewable user profile that is not visually displayed by the web browser but that is publicly accessible by others.

7. The method of claim 1, wherein detecting the hidden sensitive information contained within the publicly-viewable user profile that is not visually displayed by the web browser but that is publicly accessible by others comprises analyzing code used to render the publicly-viewable user profile.

8. The method of claim 7, wherein analyzing the code used to render the publicly-viewable user profile comprises automatically detecting, using at least one pattern-matching heuristic, the hidden sensitive information within the code.

9. The method of claim 7, wherein analyzing the code used to render the publicly-viewable user profile comprises:
   identifying, within the code, programmable tags that map to environment variables within the code that contain sensitive information;
   determining that the environment variables are not visually displayed by the web browser.

10. The method of claim 7, wherein the code used to render the publicly-viewable user profile comprises at least one of:
    programming language code;
    non-computational language code.

11. The method of claim 1, further comprising assigning a security-threat level to the hidden sensitive information that identifies how severe of a security risk the hidden sensitive information poses, wherein the security-threat level is based at least in part on:
    the nature of the hidden sensitive information;
    whether the hidden sensitive information was intentionally hidden.

12. The method of claim 1, wherein warning the user comprises:
    generating a graphical user interface on the client-side computing device;
    displaying, via the graphical user interface, a notification that identifies the hidden sensitive information.

13. The method of claim 12, wherein the notification further identifies a security-threat level assigned to the hidden sensitive information that identifies how severe of a security risk the hidden sensitive information poses.

14. The method of claim 1, wherein the hidden sensitive information comprises at least one of:
    a user's name;
    a user's age;
    a user's date of birth;
    a user's gender;
    a user's mailing address;
    a user's email address;
    a user's telephone number;
    a user's fax number;
    a user's instant-messaging address.

15. A system for detecting and warning users about hidden sensitive information contained in webpages, the system comprising:
    a webpage-identification module installed within a web browser on a client-side computing device, wherein the webpage-identification module is programmed to identify a publicly-viewable user profile accessed by the web browser on the client-side computing device;
    a hidden-information-detection module installed within the web browser on the client-side computing device, wherein the hidden-information-detection module is programmed to detect hidden sensitive information contained within the publicly-viewable user profile but that is not visually displayed by the web browser but that is publicly accessible by others, wherein the hidden sensitive information comprises information associated with an owner of the publicly-viewable user profile that the owner wishes to keep private;
    an interface module installed within the web browser on the client-side computing device, wherein the interface module is programmed to warn a user of the client-side computing device that the publicly-viewable user profile contains the hidden sensitive information associated with the owner of the publicly-viewable user profile that is not visually displayed but that is publicly accessible by others;
    at least one microprocessor configured to execute at least one of the webpage-identification module, the hidden-information-detection module, and the interface module.

16. The system of claim 15, wherein the webpage identification module identifies the publicly-viewable user profile by at least one of:
    receiving a request from the user to scan the publicly-viewable user profile for hidden sensitive information;
    automatically detecting when the web browser accesses the publicly-viewable user profile;
    detecting a successful attempt by the user to log into, via the web browser, the publicly-viewable user profile.

17. The system of claim 15, wherein the interface module warns the user by:
    generating a graphical user interface on the client-side computing device;
    displaying, via the graphical user interface, a notification that identifies the hidden sensitive information.

18. The system of claim 15, wherein the hidden-information-detection module is further programmed to assign a security-threat level to the hidden sensitive information that identifies how severe of a security risk the hidden sensitive information poses, wherein the security-threat level is based at least in part on:
    the nature of the hidden sensitive information;
    whether the hidden sensitive information was intentionally hidden.

19. The system of claim 15, wherein the hidden-information-detection module detects the hidden sensitive information by analyzing code used to render the publicly-viewable user profile.

20. A non-transitory computer-readable medium comprising one or more computer-readable instructions that, when executed by a processor of a client-side computing device, cause the client-side computing device to:
    identify, by a plug-in installed within a web browser on the client-side computing device, a publicly-viewable user profile accessed by the web browser on the client-side computing device;
    detect, by the plug-in installed within the web browser on the client-side computing device, hidden sensitive information contained within the publicly-viewable user profile that is not visually displayed by the web browser but that is publicly accessible by others, wherein the hidden sensitive information comprises information associated with an owner of the publicly-viewable user profile that the owner wishes to keep private;
    warn, by the plug-in installed within the web browser on the client-side computing device, a user of the client-side computing device that the publicly-viewable user profile contains the hidden sensitive information associated with the owner of the publicly-viewable user profile that is not visually displayed but that is publicly accessible by others.

* * * * *

UNITED STATES PATENT AND TRADEMARK OFFICE
CERTIFICATE OF CORRECTION

PATENT NO. : 8,225,396 B1
APPLICATION NO. : 12/412785
DATED : July 17, 2012
INVENTOR(S) : William Gauvin It is certified that error appears in the above-identified patent and that said Letters Patent is hereby corrected as shown below:

Claim 15, at column 15, lines 55 to 64, should read:

a hidden-information-detection module installed within the web browser on the client-side computing device, wherein the hidden-information-detection module is programmed to detect hidden sensitive information contained within the publicly-viewable user profile that is not visually displayed by the web browser but that is publicly accessible by others, wherein the hidden sensitive information comprises information associated with an owner of the publicly-viewable user profile that the owner wishes to keep private;

Signed and Sealed this
Twentieth Day of November, 2012

David J. Kappos
*Director of the United States Patent and Trademark Office*